(12) United States Patent
Kasterstein et al.

(10) Patent No.: US 9,323,844 B2
(45) Date of Patent: Apr. 26, 2016

(54) SYSTEM AND METHODS THEREOF FOR ENHANCING A USER'S SEARCH EXPERIENCE

(75) Inventors: Rami Kasterstein, Givataim (IL); Amihay Ben-David, London (GB)

(73) Assignee: Doat Media Ltd., Tel Aviv (IL)

( * ) Notice: Subject to any disclaimer, the term of this patent is extended or adjusted under 35 U.S.C. 154(b) by 277 days.

(21) Appl. No.: 13/156,999

(22) Filed: Jun. 9, 2011

(65) Prior Publication Data

US 2011/0307463 A1     Dec. 15, 2011

Related U.S. Application Data

(60) Provisional application No. 61/468,095, filed on Mar. 28, 2011, provisional application No. 61/354,022, filed on Jun. 11, 2010.

(51) Int. Cl.
*G06F 17/30* (2006.01)

(52) U.S. Cl.
CPC .... *G06F 17/30864* (2013.01); *G06F 17/30716* (2013.01)

(58) Field of Classification Search
CPC ................................................ G06F 17/30864
USPC ......... 707/706, 707, 712, 713, 722, 736, 758, 707/781, 999.003
See application file for complete search history.

(56) References Cited

U.S. PATENT DOCUMENTS

| | | | |
|---|---|---|---|
| 5,911,043 A | 6/1999 | Duffy et al. | |
| 5,924,090 A | 7/1999 | Krellenstein | |
| 6,484,162 B1 * | 11/2002 | Edlund et al. | |
| 6,546,388 B1 | 4/2003 | Edlund et al. | |
| 7,266,588 B2 | 9/2007 | Oku | |
| 7,302,272 B2 | 11/2007 | Ackley | |
| 7,359,893 B2 | 4/2008 | Sadri et al. | |
| 7,533,084 B2 | 5/2009 | Holloway et al. | |

(Continued)

FOREIGN PATENT DOCUMENTS

| WO | 2007047464 | 4/2007 |
|---|---|---|
| WO | 2010014954 | 2/2010 |

OTHER PUBLICATIONS

Qin et al., "Learning to Rank Relationship Objects and Its Application to Web Search", International World Wide Web Conference 2008 / Refereed Track: Search—Ranking & Retrieval Enhancement; Apr. 21-25, 2008; Beijing, China.

(Continued)

*Primary Examiner* — Syling Yen
(74) *Attorney, Agent, or Firm* — M&B IP Analysts, LLC

(57) ABSTRACT

A method for enhancing web search experience of users. The method comprises selecting at least one resource from a plurality of resources to respond to an input query received from a user on a user device; sending the input query to the selected at least one resource; designating a unique display segment within a display area on the user device, wherein each display segment corresponds to each of the selected at least one resource; causing the selected at least one resource to respond to the input query within the corresponding unique display segment; and establishing a direct communication between each of the selected at least one resource and the user device for at least enabling, in response to the query, interaction of the selected at least one resource with the user within the unique display segment corresponding to the selected resource.

30 Claims, 7 Drawing Sheets

(56) References Cited

U.S. PATENT DOCUMENTS

| | | | |
|---|---|---|---|
| 7,636,900 B2 | 12/2009 | Xia | |
| 7,721,192 B2 | 5/2010 | Milic-Frayling et al. | |
| 7,774,003 B1 | 8/2010 | Ortega et al. | |
| 7,783,419 B2 | 8/2010 | Taniguchi et al. | |
| 7,974,976 B2 | 7/2011 | Yahia et al. | |
| 8,032,666 B2 | 10/2011 | Srinivansan et al. | |
| 8,086,604 B2 | 12/2011 | Arrouye et al. | |
| 8,312,484 B1 | 11/2012 | McCarty et al. | |
| 8,571,538 B2 | 10/2013 | Sprigg et al. | |
| 8,606,725 B1 | 12/2013 | Agichtein et al. | |
| 8,718,633 B2 | 5/2014 | Sprigg et al. | |
| 2004/0186989 A1 | 9/2004 | Clapper | |
| 2005/0060297 A1 | 3/2005 | Najork | |
| 2005/0076367 A1 | 4/2005 | Johnson et al. | |
| 2005/0102407 A1 | 5/2005 | Clapper | |
| 2005/0283468 A1 | 12/2005 | Kamvar et al. | |
| 2006/0031529 A1 | 2/2006 | Keith | |
| 2006/0064411 A1 | 3/2006 | Gross et al. | |
| 2006/0136403 A1 | 6/2006 | Koo | |
| 2006/0277167 A1* | 12/2006 | Gross et al. | 707/3 |
| 2007/0082707 A1 | 4/2007 | Flynt et al. | |
| 2007/0174900 A1 | 7/2007 | Marueli et al. | |
| 2007/0204039 A1 | 8/2007 | Inamdar | |
| 2008/0133605 A1 | 6/2008 | MacVarish | |
| 2008/0222140 A1 | 9/2008 | Lagad et al. | |
| 2008/0256443 A1* | 10/2008 | Li et al. | 715/700 |
| 2008/0306913 A1 | 12/2008 | Newman et al. | |
| 2008/0306937 A1 | 12/2008 | Whilte et al. | |
| 2008/0307343 A1 | 12/2008 | Robert et al. | |
| 2009/0013285 A1 | 1/2009 | Blyth et al. | |
| 2009/0049052 A1 | 2/2009 | Sharma et al. | |
| 2009/0077034 A1 | 3/2009 | Kim et al. | |
| 2009/0094213 A1 | 4/2009 | Wang | |
| 2009/0125482 A1 | 5/2009 | Peregrine et al. | |
| 2009/0210403 A1* | 8/2009 | Reinshmidt et al. | 707/4 |
| 2009/0234811 A1 | 9/2009 | Jamil et al. | |
| 2009/0234814 A1 | 9/2009 | Boerries et al. | |
| 2009/0239587 A1 | 9/2009 | Negron et al. | |
| 2010/0030753 A1* | 2/2010 | Nad et al. | 707/3 |
| 2010/0042912 A1 | 2/2010 | Whitaker | |
| 2010/0262597 A1 | 10/2010 | Han | |
| 2010/0268673 A1 | 10/2010 | Quadracci | |
| 2010/0274775 A1 | 10/2010 | Fontes et al. | |
| 2010/0299325 A1 | 11/2010 | Tzvi et al. | |
| 2011/0029925 A1 | 2/2011 | Robert et al. | |
| 2011/0035699 A1 | 2/2011 | Robert et al. | |
| 2011/0041094 A1 | 2/2011 | Robert et al. | |
| 2011/0047145 A1 | 2/2011 | Ershov | |
| 2011/0055759 A1 | 3/2011 | Robert et al. | |
| 2011/0058046 A1 | 3/2011 | Yoshida et al. | |
| 2011/0078767 A1 | 3/2011 | Cai et al. | |
| 2011/0093488 A1* | 4/2011 | Amacker et al. | 707/767 |

OTHER PUBLICATIONS

Nie et al., "Object-Level Ranking: Bringing Order to Web Objects", International World Wide Web Conference 2005; May 10-14, 2005; Chiba, Japan.

International Searching Authority: International Search Report including "Written Opinion of the International Searching Authority" (PCT Rule 43bis.1) for the related International Patent Application No. PCT/US2011/039808; Date of Mailing: Feb. 9, 2012.

* cited by examiner

SYSTEM AND METHODS THEREOF FOR ENHANCING A USER'S SEARCH EXPERIENCE

CROSS-REFERENCE TO RELATED APPLICATIONS

This application claims the benefit of U.S. provisional application No. 61/354,022 filed on Jun. 11, 2010, and U.S. provisional application No. 61/468,095 filed on Mar. 28, 2011, the contents of each are herein incorporated by reference.

TECHNICAL FIELD

The disclosed invention generally relates to search engines, and more specifically to directing a search query to desired sources of answers and presentation of the answers on the display of a user's device.

BACKGROUND OF THE INVENTION

Web search engines are increasingly becoming the method by which users seek information on the World Wide Web (herein abbreviated WWW). As the WWW continues to grow in size, the task of finding relevant and pertinent information to a user's search query becomes increasingly complex. Not only do users expect answers to their search queries to be returned instantaneously, they also expect that the top answers returned relate specifically to what they are searching for.

Web search engines are computer programs accessible by web browsers which are designed to search the WWW and retrieve web pages that are files and documents accessible on the WWW and hosted by websites.

In general, web search engines generate large databases and indexes of websites and webpages accessible on the WWW, in a process known as web crawling. Such databases and indexes are updated frequently as websites and webpages are added, deleted, and changed very frequently on the WWW. The databases of a web search engine may include information regarding each webpage in the databases such as the actual words on the webpage, and the index usually includes information relating to how a webpage should be classified and indexed in the databases. When a user submits a search query to a web search engine, the web search engine uses its indexing system to determine which webpages in its databases match the search query it was provided with. The web search engine may be able to rank the webpages in its database which most closely match the search query it was provided with. The webpages which most closely match the search query are returned to the user and usually presented in the form of a list, also known as search results, a search results list, or even an 'answer' to a user's search query.

There are two types of searching methods that can be performed by web search engines. In the first method, as implemented by search engines, such as Google® and Bing, the input query is checked only against the indexes and databases maintained by the search engine. That is, a search query input to a Google's search engine is fully served by Google's databases and indexes and will not be relayed to other engines (e.g., to retrieve the result).

Web search engines such as Dogpile®, Ask.com® and Metacrawler® are meta-search engines, also known as secondary search engines, which provide a submitted search query to various other web search engines and present search results which have been aggregated from a plurality of web search engines to a user. Other types of known web search engines include vertical comparison engines as well as widget and gadget-based personal homepage dashboards. Vertical comparison engines are search engines which compare items for sale from various other websites. For example, PriceGrabber.com® and Shopzilla®.com enable a user to compare the price of a given product at multiple stores.

The search results returned from each of the web search engines provided with the search query are compared to eliminate duplicate items in the search results returned by different web search engines. The comparison may also include counting the number of times a particular file or document is returned across the web search engines for a given search query. Then, the returned search results from each of the web search engines provided with the search query are ranked. Ranking substantially refers to the procedure wherein the relevancy of a returned file or document to the received search query is determined. The returned search results from all of the web search engines are ranked, thereby determining which items in the search results are possibly more relevant as answers to the user's search query than others. Many methods for ranking webpages and websites, files and documents are known in the art, each of which use different criteria for determining the relevancy of a given item in a search results list to the user's search query.

Finally, the search results from each of the web search engines are aggregated into a combined search results list. The combined list may be combined based on the comparing of search results in and/or the ranking of search results. The webpage(s) displaying the search results substantially include a list of links to websites and webpages related to the search query. In some cases, the return search results would also include images, videos, news feeds, and the like, which are also displayed to the user.

Widget and gadget-based personal homepage dashboards enable a user to design a personalized homepage or personal web portal which may include a plurality of applications known as widgets or gadgets that can provide a user with information. Netvibes®.com, iGoogle and My Yahoo!® are all examples of widget and gadget-based personal homepage dashboards.

FIG. 8 shows a schematic illustration showing a search results webpage of 50 that includes a window 51 in which the search results are shown. The window 51 includes a search bar 52 and a cursor 54, wherein a user can type in a search query, as well as a search button 56 for submitting the search query to a web search engine. As in standard web search engines, the window in which a user can interact with the web search engine is substantially divided into two by a line 58. Above line 58 is the interface in window 51 for submitting a search query, whereas below line 58, search results are presented to the user.

In the exemplary FIG. 8, a user submitted a search query to a web search engine and received search results which are shown schematically below line 58. First shown are sponsored search results 60 and then a first website description 62 for a first website. First website description 62 represents a description of a website which substantially matched the user's search query as determined by the web search engine. Below first web site description 62 are four images $64_1$, $64_2$, $64_3$ and $64_4$. Each of four images $64_1$, $64_2$, $64_3$ and $64_4$ represents images which also substantially matched the user's search query as determined by the web search engine. The web search engine then returned a second website description 66 for a website as well as two videos $68_1$ and $68_2$, all of which substantially matched the user's search query. Below the two videos $68_1$ and $68_2$, the web search engine also returned news results 70, which are substantially links to documents from news websites that mention words in the user's search query. Below the news results 70, the web search engine also returned a list of alternate search queries 72 which are similar to the search query submitted by the user via search bar 52.

The schematic search results webpage 50 would be returned whether the user performs the search query using a PC, a smartphone, a tablet device, or devices from which a user can provide a query from and receive a response to. Web search engines have not substantially adapted the return webpages to the device generating the query, and hence displaying the results. The user experience when reviewing the results is very limited, as the user has to scroll down and review each web site's description returned by the text. This approach is very inconvenient when trying to review the results over, e.g., a smartphone having a small display.

Furthermore, while the results as displayed to users maybe catered to the user's personal preferences, they do not reflect a personalized, real-time and deep web content. This is due to the fact that prior art search engines provide the links based on a crawl function. That is, the data provided reflects content stored on the server(s) of the search engine, rather than data that is provided by a resource to which a link is provided to. Hence, such a resource may change its content and provide useless information once accessed based on the link provided.

It would be therefore advantageous to provide a solution that would overcome the limitation of existing web search engines.

SUMMARY OF THE INVENTION

Certain embodiments disclosed herein include a method for enhancing web search experience of users. The method comprises selecting at least one resource from a plurality of resources to respond to an input query received from a user on a user device; sending the input query to the selected at least one resource; designating a unique display segment within a display area on the user device, wherein each display segment corresponds to each of the selected at least one resource; causing the selected at least one resource to respond to the input query within the corresponding unique display segment; and establishing a direct communication between each of the selected at least one resource and the user device for at least enabling, in response to the query, interaction of the selected at least one resource with the user within the unique display segment corresponding to the selected resource.

Certain embodiments disclosed herein also include a system for enhancing search experience of users. The system comprises a database containing information respective of a plurality of resources and metadata respective of an experience classification; an interface for receiving a query from a user device; a computing unit for: selecting which resources of the at least one resource is capable of responding to the query, opening a display area on the user device containing at least a display segment and associating the at least display segment with one of the selected at least one resource, and establishing a direct communication between the selected at least one resource and the user device for at least enabling interaction of the selected at least one resource with the user within the at least display segment corresponding to the selected resource; and an interface for sending search terms of the query to the selected at least one resource, wherein the selected at least one resource interacts with the user in response to the query.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

Figure 1:
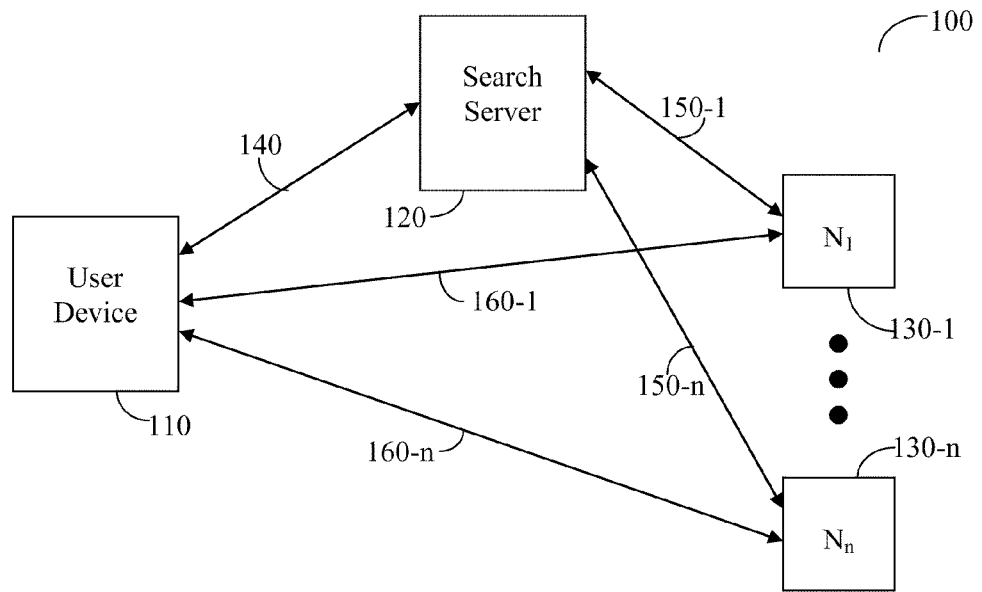
FIG. 1 is a schematic diagram of the operation of the system in accordance with an embodiment of the invention.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

According to certain exemplary embodiments of the invention, in order to perform an effective search technique a user device communicates with a search server and provides a search query that is comprised of search terms and/or, when applicable, search metadata. According to certain embodiments, the metadata may be provided by the user of the user device, the user device, and/or a search server as described in further detail herein below. The metadata maybe respective of certain types of user input queries that the resource can handle. The search server is configured to analyze the search query and provide the search terms to appropriate resources that can provide answers to the query and hence is also referred to as a resource publisher. The query is provided to the resources in the way that the resource can handle the query and respond thereto. If the query contains metadata, it may be used to determine such appropriate resources. The search server further allocates on the user device a display area having display segments for at least a portion of the resources deemed appropriate to answer the query. Each resource provides the answers directly to its corresponding display segment on the user device without further intervention by the search server, thereby allowing a resource, described in further detail herein below, to provide a place where the resource is free to provide a response to the query in any way it may wish, including, without limitation, opening a web page, allow interactions with one or more resources and more.

FIG. 1 depicts an exemplary and non-limiting schematic diagram 100 of the operation of the system in accordance with an embodiment of the invention. A user of a device 110 submits over communication link 140 a query to the search server 120. A query comprises search terms and in some embodiments of the invention also metadata about the user and the user device 110. Such metadata may include, but is not limited to, search history, time, a device type, social friends, a location, a keyword, a category, and more. It should be further noted that responsive to entering query search terms, metadata terms may be provided by the search server 120 and displayed on the user device 110 in an interactive loop allowing the user of the user device 110 to further refine the query.

The search server 120 is configured to receive the query and process it to determine which resources from a plurality of resources 130-1 through 130-n are the most appropriate to submit the query to. The resources 130 includes, but are not limited to, a plurality of web search engines, servers of content providers, vertical comparison engines, servers of content publishers, and so on. It should be further noted that according to an embodiment of the invention, a resource can respond within an application that is installed on the user device 110. This allows, for example and without limitation, the launch of the iTunes® app if the query is music related.

For example, if the query term is "Hector Berlioz" then it is most likely that the best answers will be from resources that are capable of handling classical music queries. In accordance with an embodiment of the invention, the search server 120 is capable of determining which would be the most appropriate resources 130 to address the query to, either by actively checking what a resource 130 can provide or by, for example, registration of a resource 130 to certain categories, such as "music" or "carpentry tools", as well as, but without limitation, registration for certain keywords. Moreover, and as further explained herein below, the search server 120 may monitor the use of the user on the user device, but not within the application in a display segment thereby maintaining user privacy with respect to the interaction with a resource 130, to determine which of the resources 130 was the most appropriate for the user and to influence thereby future references to that resource.

In one embodiment of the invention, an operator is used between the search term and a metadata term, for example, the operator "@". The metadata term may be, but is not limited to, a category, a specific resource 130, a location, a keyword, and so on. A user can therefore submit a query for "Beethoven @ music" which would then be directed to, and answered by, selected resources 130 that the server 120 determines to be capable of answering music related queries. However, the query "Beethoven @ Movies" will be directed to potentially a different group of sources from the resources 130, and one result could be the movie Beethoven with a Saint Bernard dog named Beethoven as a star of the movie. The function of this operator will be discussed in more detail herein below. The operator can be provided by the user or selected between suggestions from the search server 120.

The search server 120, once one or more appropriate resources from the resources 130 have been identified, sends search requests to such selected resources 130 over communication links 150-1 through 150-n. It is not necessary to send the search requests, or a variation thereof, to all the resources 130-1 through 130-n but only to the subgroup that is determined to be relevant for the query.

The search server 120 further provides a display area containing display segments unique for each of the resources 130 determined to be appropriate for receiving the query, and such appropriate resources are directed to communicate directly with their respective display segment on the user device over communication links 160. Thus, the search server 120 establishes a direct communication between the resources 130 respective display segments. The display area may be an application of its own right, such as, but not limited to, a web browser.

In one embodiment of the invention, and as further explained herein below, only a portion of the selected resources of the resources 130 are designated with a display segment. Those selected resources that do not have an allocation of a display segment are approached when the user requests, for example, information from additional selected resources. By mere example, if there are thirty selected resources the display area may be designed to contain only ten display segments, therefore only the top ten of the selected resources are associated with a display segment. The other selected resources can be associated with the display segment upon a request for more information made by the user and as further explained below. As a result it is not necessary for the server 120 to have any specific information or data regarding the actual content residing on the resource, unlike the prior art. The only ability needed is to determine which resource of the resources 130 is appropriate to provide a certain answer to a query and, potentially, is a resource trusted by a user of the device 110.

It should be noted that the server 130 provides the query, or search terms thereof, to a resource 130 in a communication format that is proper for that specific resource thereby enabling search of such resources that require structured interface to perform any kind of successful search. The search server 120 is therefore capable of communicating directly with a variety of resources each having its own requirement to respond to a query. It should be noted that the communication links 140, 150, and 160 may occur over a common network such as, but not limited to, a local area network (LAN), a wide area network (WAN), a metro area network (MAN), the world wide web (WWW), the Internet, a wired network, a wireless network, and the like, as well as any combination thereof.

It should be noted that although not shown in FIG. 1, the search server 120 may also include a database for maintaining information respective each of the resources, an interface for receiving a query from a user device, an interface for sending queries to the selected resources a computing unit, e.g., a processor, adapted to perform the at least tasks of selecting resources and opening the display area and segments on the user device, and allocating such display segments to resources. These tasks are described in greater detail below.

Figure 2:
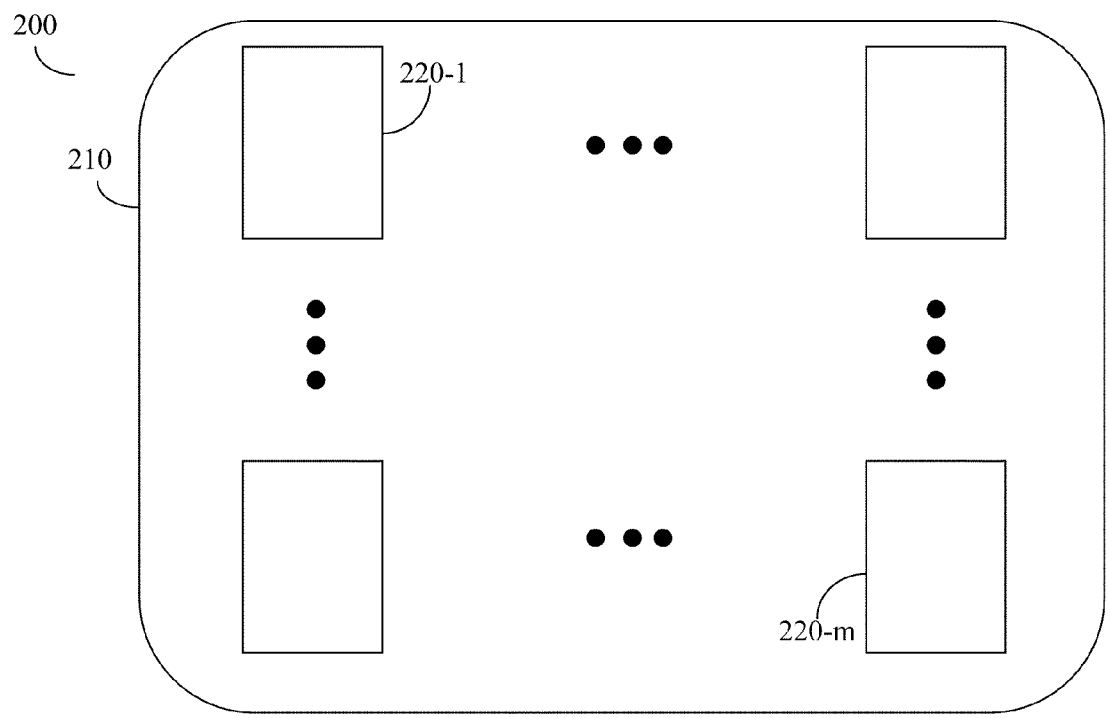
FIG. 2 is a display area with display segments on a display screen of a typical personal computer (PC) in accordance with an embodiment of the invention.

FIG. 2 shows an exemplary and non-limiting display area 210 on a display screen 200 of a typical personal computer (PC) rendered in accordance with an embodiment of the invention. It should be understood that a PC is provided here as an example. Other devices having displays that are large enough to display a plurality of items large enough to be readily recognized include the likes of screens of notebook computers, tablet computers, and the like. It is further understood that display screen 200 can be an independent application or hosted and displayed in another application such as a web browser. The server 120 may further determine the order of the display areas based on various parameters that are outside of the scope of the instant patent application.

The display area 210 is allocated by the search server 120 to a plurality of display areas 220, from display segment 220-1 through display segment 220-m (when m is an integer number). The number of actual display segments 220 corresponds to the number of appropriate resources 130 to which the query was referred to by the server 120. Each display segment 220 is allocated to one of the appropriate resources 130 which interacts with the user from within that display segment. In one embodiment, only a portion of the selected resources of the resources 130 is designated with a display segment. Those selected resources that do not have an allocation of a display segment are approached when the user requests, for example, information from additional selected resources. In yet another embodiment, a scroll function can be implemented as part of the display area 210 to enable viewing of otherwise hidden display segments. One of ordinary skill would readily realize that rather than the prior art approach of providing links based on data stored at the search engine level, for example, the Google® style, in response to a query, in accordance with the invention one or more display segments 220 that contain the response from the appropriate resources 130 are provided to the user device 110, without storing at the search server 120 any such data.

It should be further noted that one display segment 220 may contain search engines, such as Google browser application, including links, as a fully functional resource publisher within a display segment 220. The advantage of the approach where content of a resource 130 is displayed within a display segment being that the search server 120 does not control what is presented to the user as is done in prior art solutions, as well as having access to the application itself immediately upon delivery of the results to the query. For example, when a "Toy Story" query is searched, one of the resources may be a Netflix service while the other is Google. Thus, one display segment 220 will present search results in a webpage format as generated by a Google search engine, while another display segment 220-n will run a Netflix player playing the movie as streamed from Netflix's servers. Thus, according to this example, the response to the query is an active application running directly by the resource publisher selected in the display segment 220-n.

An active application as discussed herein includes, but is not limited to, a web application, and a native application. A web application is any application that can be accessed on the WWW via a web browser and typically use a HTML format. Typically, a web application is executed by a web server and the user device (client) receives the processing results, for example, a web application for booking flight tickets. A native application, as defined herein, is any software application that runs on the user device 110 and can, but is not required, to be accessed by using the Internet or via a connection to the Internet. For example, native applications are installed on PCs, smartphones, or tablet computers (e.g., Apps for Apple's iPhone and iPAD) are such examples of Internet applications. Typically, such applications do not require a web browser to access information and be executed by the user device (e.g., a smartphone). Examples for native applications include applications that play movies, applications that download songs, applications through which a user can order a pizza, applications through which a user can request an electrician to make a house call, and the like.

Figure 3:
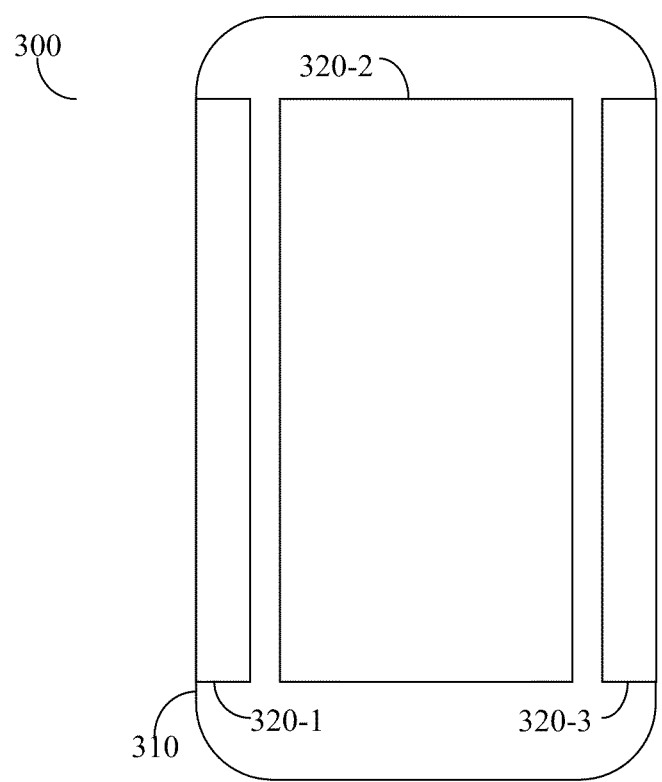
FIG. 3 is a display area with display segments of a mobile device in accordance with an embodiment of the invention.

FIG. 3 shows an exemplary and non-limiting display area 310 of a mobile device screen 300 rendered in accordance with an embodiment of the invention. The mobile device typically has a small screen form factor and therefore display techniques that differ from that shown with respect to a PC in FIG. 2 should be used. As noted above, as a result of a query entered by a user, one or more appropriate resources 130 respond with application data that is directed into corresponding display segments 320. Because of the nature of the smaller screen the center of the display area 310 is used for one display segment, for example display segment 320-2, while from the left and the right there are other display segments, 320-1 on the left and 320-3 on the right, that can be viewed by using an appropriate gesture or other means of scrolling from left to right or right to left.

Figure 4:
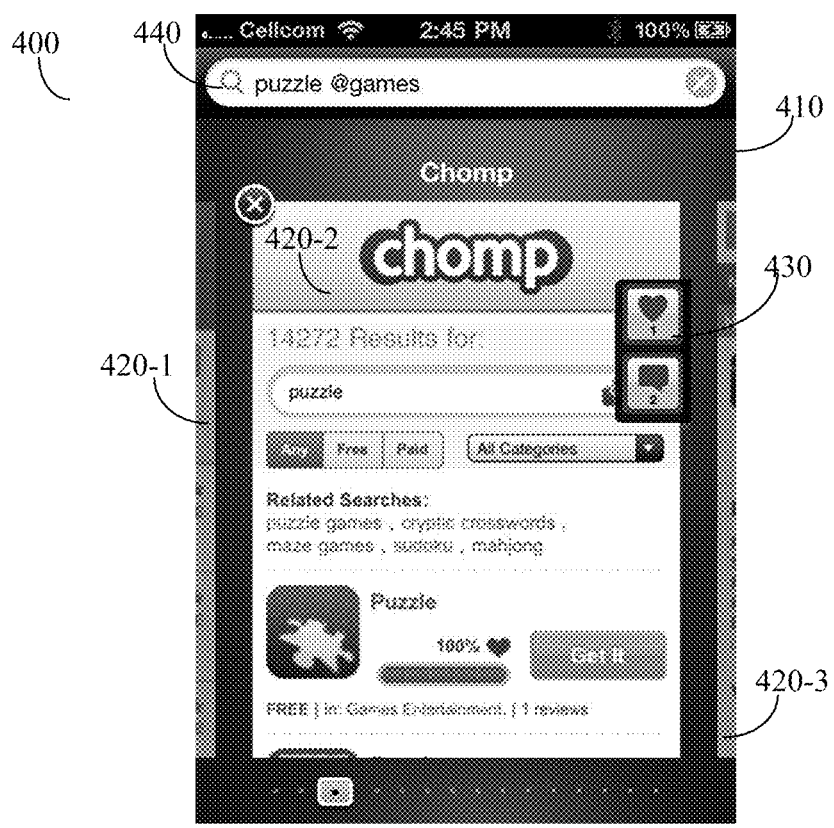
FIG. 4 is a screenshot of a screen of a mobile device displaying a display area with display segments in accordance with an embodiment of the invention.

FIG. 4 shows an exemplary and non-limiting screenshot 400 off of a screen of a typical mobile device displaying a display area 410 and display segments 420 thereon, rendered in accordance with an embodiment of the invention.

In one embodiment, icons 430 may enable the user of the user device to provide feedback to the search server 120 with respect to the current display segment, for example, display segment 420-2. For example, and without limitation, an icon may allow providing a feedback that the information is useful and liked by the user, another icon may provide the opposite feedback, and so on. This feedback may be used for both determination of the relevance of the information provided by the resource responsive of the query, as well as to the user's preferences. Thus, the feedbacks provided by the users are utilized to adaptively update the selection of resources for users' queries. The user can enter a query that may contain search terms as well as metadata terms as explained hereinabove, in window 440.

Figure 5A:
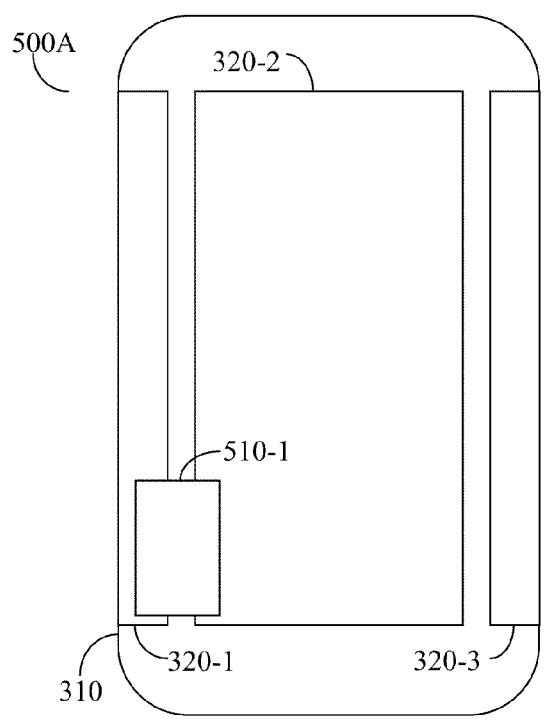
FIGS. 5A and 5B are display areas of a mobile device with a selection mini-display segment slider in accordance with an embodiment of the invention.
Figure 5B:
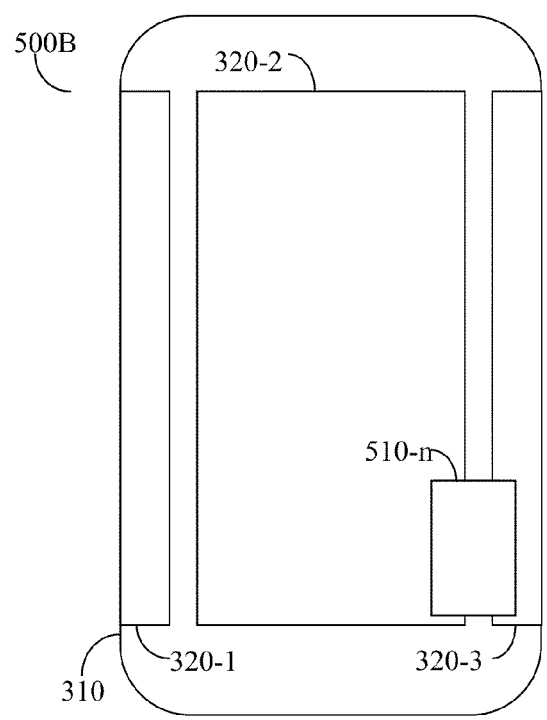
Figures 6A, 6B:
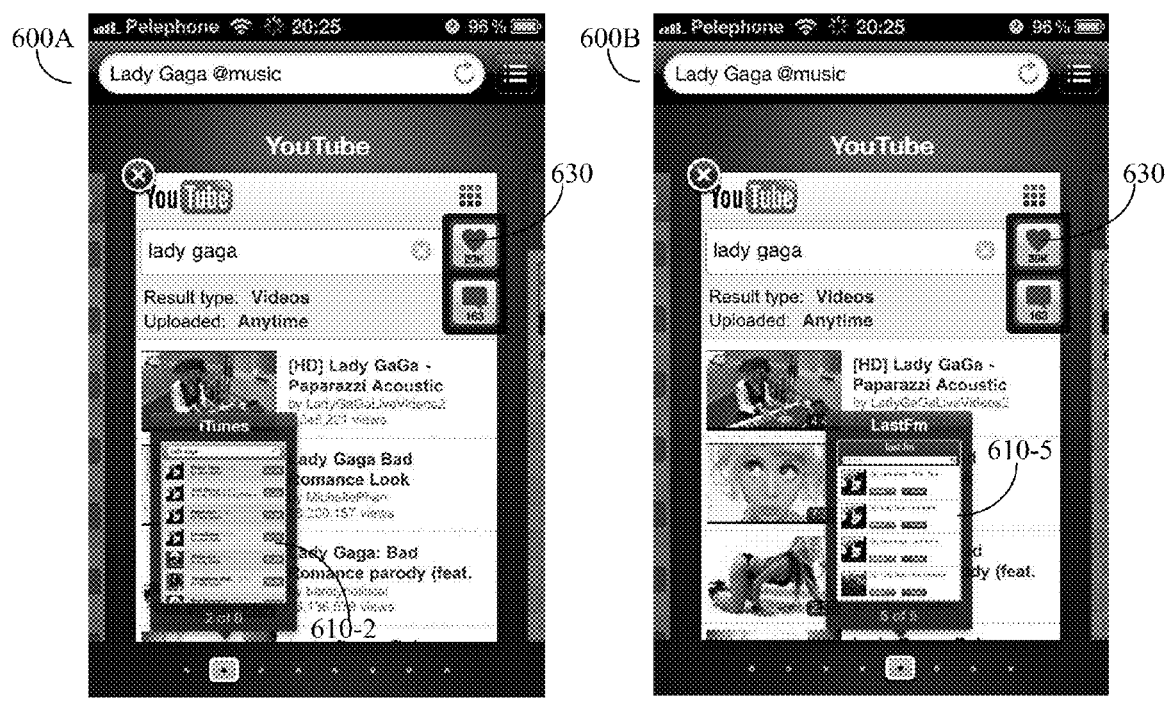
FIGS. 6A and 6B are screenshots of screens of a mobile device displaying a display area with a selection of mini-windows in accordance with an embodiment of the invention.

FIGS. 5A and 5B depict exemplary and non-limiting display areas 310 of a mobile device with a selection mini-display segments 510 displayed in accordance with several exemplary embodiments of the invention. In FIG. 5A, a mini-display segment 510-1 corresponds to the larger display segment 320-1 which is mostly, but for its most right portion, outside of the display area 310. The mini-display segment 510 enables the display of not currently visible display segments 320 in a fully functional application form. A plurality of such mini-display segments can be shown up to the last one, for example 510-m as shown in FIG. 5B and being viewed in a slider fashion from the first to the last rolling one the display area. Corresponding non-limiting screenshots 600A and 600B are respectively shown in FIGS. 6A and 6B.

In one embodiment of the invention, only a portion of the selected resources of the resources 130-1 through 130-n are designated with a display segment. Those selected resources that do not have an allocation of a display segment are approached when the user requests, for example, information from additional selected resources. Mini-display segments (e.g., mini-display segments, labeled 610-2 and 610-5, are shown, while a plurality of others, such as 610-1, 610-3, 610-4, 610-6, etc., are not shown for display clarity) correspond in this case to the number of display segments made available, and additional mini-display segments are added once additional information from other selected resources is requested. The display segments may also include icons 630 enabling the user of the user device to provide feedback to the search server 120 with respect to the current display segment.

In accordance with an embodiment of the invention, the display segments (shown in FIGS. 3 through 6) may include social tools for sharing the retuned results with contacts stored in a social network website, such as Facebook® or LinkedIn®.

Figure 7:
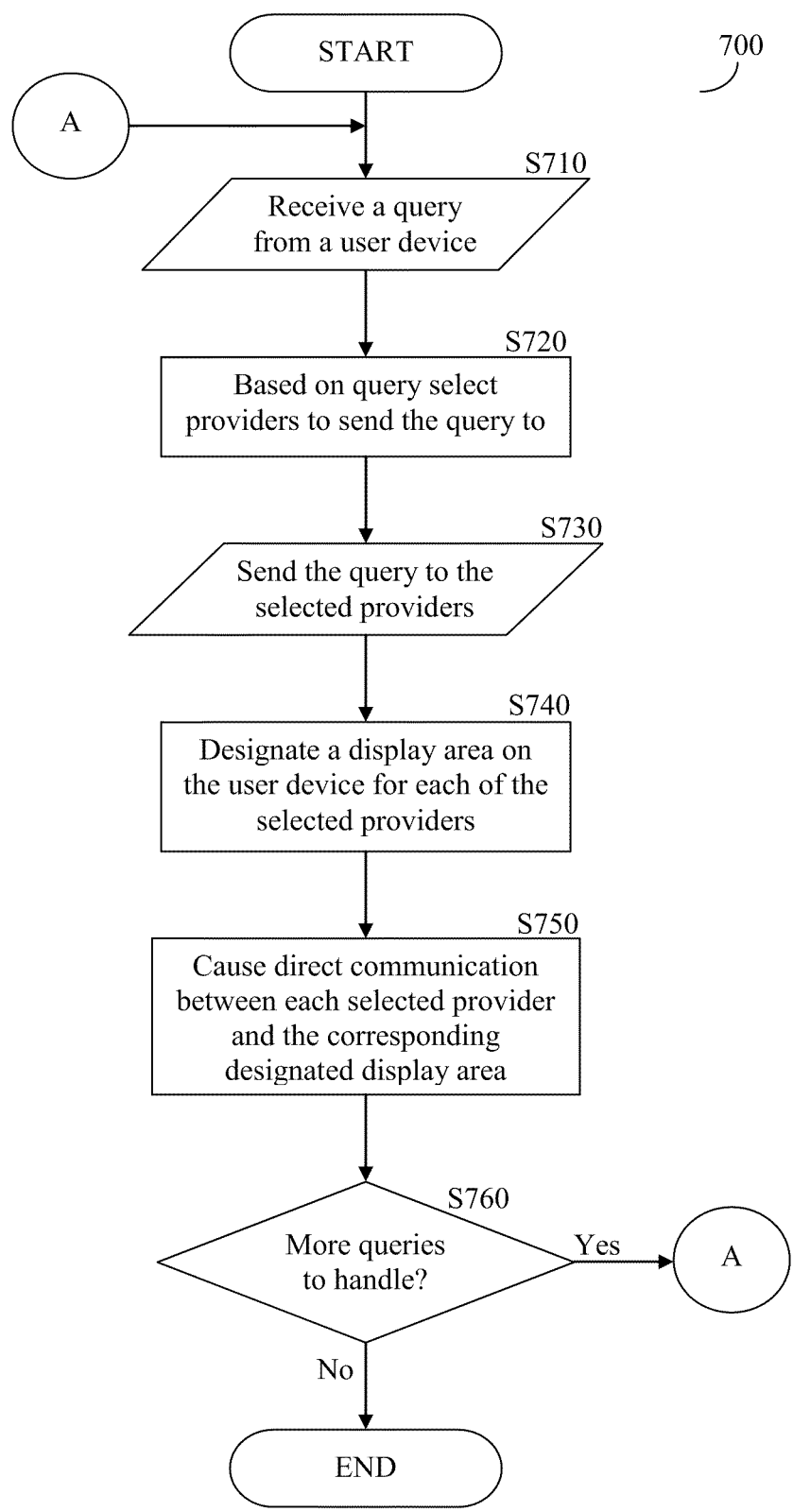
FIG. 7 is a flowchart describing the operation of the system.
Figure 8:
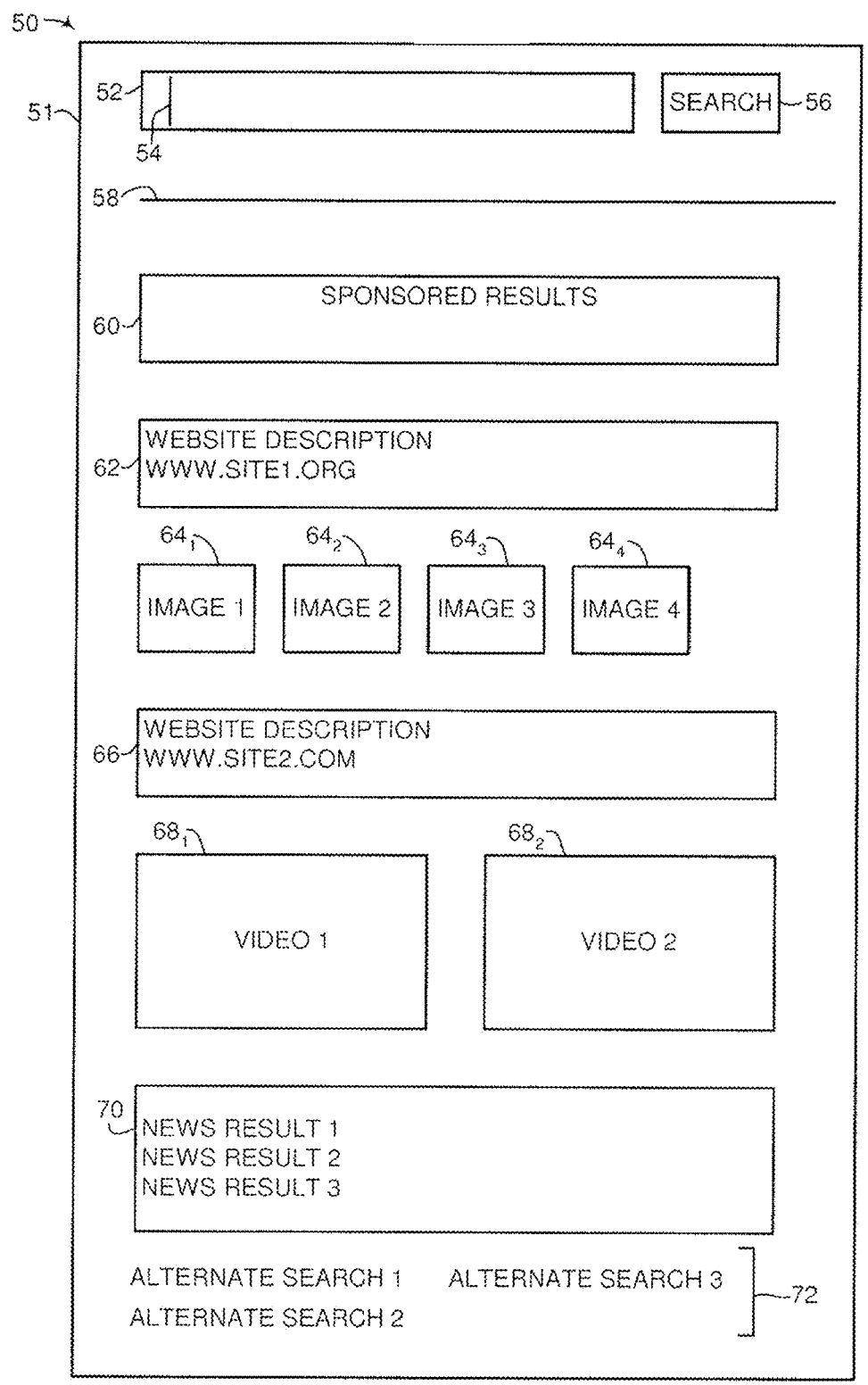
FIG. 8 is schematic illustration of a search results webpage using conventional web search engine.

FIG. 7 shows an exemplary and non-limiting flowchart 700 describing the operation of the search server 120 according an embodiment of the invention. In S710, the search server 120 receives a query from a user device, for example, a user device 110. In one embodiment of the invention, the metadata is automatically populated and provided to the user, for example, through a display of optional metadata, for better experience classification. That is, if a user searches for example the term "Madonna," the experience classification may be for music, religion, movies, and more. Such metadata may be preset in the server 120, or otherwise be constantly updated or calculated in real-time for a group of users or even on an individual basis to better fit a particular user's preferences, or can be entered by the user as part of the user query. For example, the server 120 may determine based, in part, on search history that the user is a music fan, thus metadata related to a music classification is provided.

In another embodiment of the invention, the server is enabled to provide metadata respective of the content used as a query provided to the resources and/or publishers, and the metadata may further include information about the geo-location of the user, so the publisher can provide location based results. For example, but without limitations, if a user is searching for Sushi, all the publishers may get the location of the user so they can provide restaurants and offers nearby the user's physical vicinity. It should be appreciated that entering search queries using such notation and metadata, simplifies the process of querying and increases the chances to retrieve results for the user's satisfaction. This approach together with novel techniques for displaying the returned results, as discussed above, enhance the users' searching experience, and specifically when searching through mobile phones and/or smart phones.

In S720, based on the input query, one or more resources are selected as being appropriate to provide answers respective of the received query. As mentioned above, the selection of one or more resources 130 is performed based on the input query, registration of the user to resources, and feedback provided by the user implicitly (e.g., which of the resources the user has been frequently using and for how long) or explicitly (e.g., using icons 430 and 630) when reviewing returned results and additional information, such as location, time of day, and/or others. Optionally, the order of the resources 130 is ranked so as to provide more appropriate resources 130 to the user of the user device 110 earlier in the search response. According to certain embodiments of the invention, various types of analyses can be executed on the input query.

In one type of analysis, a semantic analysis may be executed, wherein at least one action is extracted from the received query. This analysis of the received input query substantially determines what kind or type of information the user is searching for or what kind of action the user wants to execute. It is noted that the kind or type of information a user is looking for can be restated as an action which the user wishes to execute. Examples for such actions may be "comparing prices" of various items and objects, "listening to" music online or "viewing" images or video online. Thus, for example, the query including "watching Toy Story", and the user device installed with a Netflix native application, then one of the selected resources would be Netflix's servers.

In S730, the query is submitted to each of the selected resources of the resources 130. In S740, the search server 120 designates a display area on the user device 110 and provides for each of the selected resources of the resources 130 a corresponding display segment, for example, a display segment 320-2. The server 120 may also provide, when applicable, one or more resources with authentication information, e.g., a user name and a password. Alternatively, the server may prompt the user to enter such information on behalf of some resource 130.

In S750, the server 120 causes each of the selected resources of the resources 130 to communicate directly with the user device 110 for the purpose of interaction with the user in the uniquely designated display segment 320 for that resource. According to an embodiment of the invention, the interaction is enabled using a native application of the resource (e.g., a Netflix player). This includes, for example, transferring to the designated display segment 230 executable code, such as hyper-text markup language (HTML) code, Java scripts, and code for causing a native application installed on the user device 110 to retrieve content/information from the resource. According to another embodiment of the invention, the interaction is enabled transferring to a display segment 230 code that returned as a result of a processing of a web application, and more, by one or more of the resources 130. In yet another embodiment, the interaction is enabled by displaying of multimedia content provided by one or more of the resources 130 in the display segment 230. Optionally, a step of collecting information for feedback and future ranking may be performed.

In S760, it is checked whether additional queries are to be handled by the search server 150 and if so execution continues with S710; otherwise, execution terminates.

The various embodiments of the invention may be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal. It should be noted that the input (e.g., input 440), the display segments (e.g., display segments 320) and mini-display segments (e.g., mini-display segments 610) may be shown on a display area that can be a browser or another other appropriate application, either generic or tailored for the purposes described in detail hereinabove.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for enhancing search experience of users, comprising:

receiving, at a search server, an input query and a metadata related to the input query sent from a user device;

selecting at least two resources from a plurality of resources responsive to the input query, wherein the selection is performed based on at least contents of the input query and the metadata;

sending the input query as an input to the at least two selected resources, wherein resources are selected based on applications available on the user device;

providing a single unique display segment within a display area on the user device for each of the at least two selected resources, wherein the content displayed in each unique display segment corresponds only to content retrieved by a corresponding selected resource;

directing the at least two selected resources to respond to the input query directly within the each provided corresponding unique display segment, wherein the each unique display segment includes at least an application of the applications available on the user device;

establishing a direct communication link between the each corresponding selected resource and the user device, without user intervention, for at least enabling direct interaction of the each corresponding selected resource with the user within the each corresponding unique display segment to enable transfer of at least contents generated by the each corresponding selected resource to the each corresponding unique display segment;

enabling a display of a first mini-display segment over the display area, wherein the first mini-display segment includes content of a first unique display segment not shown over the display area; and displaying content from the corresponding selected resource in the first mini-display segment in a fully functional application form.

2. The method of claim 1, wherein the unique display segment is any one of: a browser and an application.

3. The method of claim 1, wherein the user device is any one of: a personal computer (PC), a notebook computer, a tablet computer, a smart phone, and a mobile device.

4. The method of claim 1, wherein the input query comprises at least a search term.

5. The method of claim 4, wherein the input query further comprises an operator followed by at least the received metadata.

6. The method of claim 1, further comprising:
enabling a display of a second mini-display segment over the display area, wherein the second mini-display segment includes content of a second unique display segment not shown over the display area; and
displaying content from the corresponding selected resource in the second mini-display segment in a fully functional application form.

7. The method of claim 6, wherein the first mini-display segment and the second mini-display segment are displayed as a slider function, thereby enabling the display of mini-display segments on the user device.

8. The method of claim 7, wherein each mini-display segment includes an icon for providing a user's feedback on the displayed information.

9. The method of claim 1, further comprising:
ranking the at least one selected resource for display on the user device.

10. The method of claim 9, wherein ranking the at least one selected resource is performed based on collection of data from previous searches that is at least one of: an explicit feedback and an implicit feedback.

11. The method of claim 1, further comprising:
providing at least metadata respective of an experience classification.

12. The method of claim 1, wherein the plurality of resources include at least web search engines, vertical comparison engines, servers of content providers, and servers of content publishers.

13. The method of claim 12, wherein the servers of content providers and servers of content publishers can execute web applications and communicate with native applications installed on the user device.

14. The method of claim 13, wherein the at least contents generated by the at least one selected resource include executable code transferred to the unique display segment.

15. The method of claim 14, wherein the executable code causes at least one of: the activation of at least one native application in the unique display segment, rendering of a search result web page as generated by a web search engine in the unique display segment, and rendering of a web page results from processing performed by a web application in the unique display segment.

16. A non-transitory computer readable medium having stored thereon instructions for causing one or more processing units to execute the method according to claim 1.

17. A system for enhancing search experience of users, comprising:
a database containing information respective of a plurality of resources and metadata respective of an experience classification;
an interface for receiving a query and a metadata related to the input query from a user device;
a processing unit configured to:
select at least two resources from the plurality of resources to respond to the input query, wherein the selection is performed based on at least contents of the input query and the metadata,
send, through the interface, the input query as an input to the at least two selected resources, wherein resources are selected based on applications available on the user device;
open a display area on the user device containing at least one unique display segment, wherein each at least one opened display segment has an association with each of the at least two selected resources, wherein the at least one unique display segment includes at least an application of the applications available on the user device,
associate the at least one display segment with the at least one selected resource; and
establish a direct communication link between the each corresponding selected resource and the user device, without user intervention, for at least enabling interaction of the at least each corresponding selected resource with the user within the each corresponding unique display segment associated for enabling transfer of at least contents generated by the at least one selected resource to the unique display segment,
enable a display of a first mini-display segment over the display area, wherein the first mini-display segment includes content of a first unique display segment not shown over the display area, and
display content from the corresponding selected resource in the first mini-display segment in a fully functional application form.

18. The system of claim 17, wherein the display segment is any one of: a browser and an application.

19. The system of claim 17, wherein the user device is any one of: a personal computer (PC), a notebook computer, a tablet computer, a smartphone, and a mobile device.

20. The system of claim 17, wherein the query comprises at least a search term.

21. The system of claim 17, wherein the query further comprises an operator followed by the metadata.

22. The system of claim 17, wherein the processing unit is further configured to enable a display of a second mini-display segment over the display area, wherein the second mini-display segment includes content of a second unique display segment not shown over the display area; and display content from the corresponding selected resource in the second mini-display segment in a fully functional application form.

23. The system of claim 22, wherein the first mini-display segment and the second mini-display segment are displayed as a slider function, thereby enabling the display of mini-display segments on the display of the user device.

24. The system of claim 23, wherein each mini-display segment includes an icon for providing a user's feedback to the displayed information.

25. The system of claim 21, wherein responsive of the query at least metadata respective of an experience classification is provided by the system.

26. The system of claim 17, wherein the plurality of resources include at least one of web search engines, vertical comparison engines, servers of content providers, and servers of content publishers.

27. The system of claim 26, wherein the at least contents generated by the at least one selected resource executable code transferred to the at least one display segment.

28. The system of claim 26, wherein the processing unit is further configured to activate of at least one native application in the at least one display segment, render a search result web page as generated by a web search engine in the at least one display segment, and render web page results from processing performed by a web application in the at least one display segment.

29. The system of claim 17, where the processing unit is further configured to rank the at least one selected resource for display on the user device.

30. The system of claim 29, wherein the processing unit is configured to rank the at least one selected resource based on collection of data from previous searches that is at least one of: an explicit feedback and an implicit feedback.

* * * * *